United States Patent
Yamazaki

(10) Patent No.: US 7,508,872 B2
(45) Date of Patent: Mar. 24, 2009

(54) SERIAL TRANSFER INTERFACE

(75) Inventor: Manabu Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 11/355,941

(22) Filed: Feb. 17, 2006

(65) Prior Publication Data

US 2007/0121767 A1  May 31, 2007

(30) Foreign Application Priority Data

Nov. 30, 2005  (JP) .............................. 2005-346223

(51) Int. Cl.
*H03H 7/40* (2006.01)
(52) U.S. Cl. .................................................. 375/233
(58) Field of Classification Search .......... 375/229–236
See application file for complete search history.

(56) References Cited

U.S. PATENT DOCUMENTS

| 4,730,343 | A | * | 3/1988 | Kanemasa et al. | 375/233 |
| 5,218,621 | A | * | 6/1993 | Cudak et al. | 375/232 |
| 5,311,546 | A | * | 5/1994 | Paik et al. | 375/232 |
| 5,684,827 | A | * | 11/1997 | Nielsen | 375/232 |
| 6,404,809 | B1 | * | 6/2002 | Zhang | 375/232 |
| 6,807,229 | B1 | * | 10/2004 | Kim et al. | 375/233 |
| 7,027,500 | B1 | * | 4/2006 | Casas et al. | 375/232 |
| 7,194,025 | B2 | * | 3/2007 | Wood et al. | 375/231 |
| 7,218,672 | B2 | * | 5/2007 | Birru | 375/233 |
| 2004/0228398 | A1 | * | 11/2004 | Kim et al. | 375/232 |
| 2004/0252754 | A1 | * | 12/2004 | Wood et al. | 375/232 |

FOREIGN PATENT DOCUMENTS

JP  11-203787 A  7/1999

* cited by examiner

*Primary Examiner*—Kevin Y Kim
(74) *Attorney, Agent, or Firm*—Arent Fox LLP

(57) ABSTRACT

To provide a serial transfer interface for realizing a transmission of a stable and high-quality signal although there are characteristic variances due to an environment change and an LSI process, a serial transfer interface is provided at least with a signal waveform correction unit for correcting the distortion of a signal waveform, a latch unit for latching the signal waveform with a synchronous clock and outputting it to a subsequent circuit, a filter characteristic adjustment unit for changing the filter characteristic of the signal waveform correction unit in a predetermined range, a clock generation unit for generating the synchronous clock having a desired phase, and a pattern discrimination unit for detection of a test pattern and control of the filter characteristic adjustment unit and the clock generation unit.

7 Claims, 7 Drawing Sheets

FIG. 6

| Equalizer Setting Number \ Clock Phase Number | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0  | 0 | 0 | 0 | 0 | 0 | 0 | 0 | 0 | 0 | 0 | 0 | 0 | 0 | 0 | 0 | 0 |
| 1  | 0 | 0 | 0 | 0 | 0 | 0 | 1 | 1 | 1 | 1 | 1 | 0 | 0 | 0 | 0 | 0 |
| 2  | 0 | 0 | 0 | 0 | 0 | 1 | 1 | 1 | 1 | 1 | 1 | 0 | 0 | 0 | 0 | 0 |
| 3  | 0 | 0 | 0 | 1 | 1 | 1 | 1 | 1 | 1 | 1 | 1 | 1 | 0 | 0 | 0 | 0 |
| 4  | 0 | 0 | 1 | 1 | 1 | 1 | 1 | 1 | 1 | 1 | 1 | 1 | 0 | 0 | 0 | 0 |
| 5  | 0 | 0 | 1 | 1 | 1 | 1 | 1 | 1 | 1 | 1 | 1 | 1 | 1 | 0 | 0 | 0 |
| 6  | 0 | 0 | 1 | 1 | 1 | 1 | 1 | 1 | 1 | 1 | 1 | 1 | 1 | 0 | 0 | 0 |
| 7  | 0 | 0 | 1 | 1 | 1 | 1 | 1 | 1 | 1 | 1 | 1 | 1 | 1 | 0 | 0 | 0 |
| 8  | 0 | 0 | 0 | 1 | 1 | 1 | 1 | 1 | 1 | 1 | 1 | 1 | 0 | 0 | 0 | 0 |
| 9  | 0 | 0 | 0 | 0 | 1 | 1 | 1 | 1 | 1 | 1 | 1 | 1 | 0 | 0 | 0 | 0 |
| 10 | 0 | 0 | 0 | 0 | 0 | 0 | 1 | 1 | 1 | 1 | 1 | 0 | 0 | 0 | 0 | 0 |
| 11 | 0 | 0 | 0 | 0 | 0 | 0 | 0 | 0 | 1 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |

※ RECEIVABLE: 1 = TEST PATTERN MATCHING OK,
NOT RECEIVABLE: 0 = TEST PATTERN MATCHING NG

50

SERIAL TRANSFER INTERFACE

BACKGROUND OF THE INVENTION

1. Field of the Invention

The present invention relates to a serial transfer interface for correcting a loss generated at a high-frequency area.

2. Description of the Related Art

Recently, the PCI (peripheral component interconnect) and PCI-X used in a standard interface, etc., being utilized to connect the processor bus of a personal computer or a server to peripheral equipment, are going to be replaced with a PCI express which is a serial transfer interface in order to improve the data transfer speed.

Similarly, the ATA (AT attachment) used for connection of an HDD and CD-ROM to a storage device has been replaced with a serial ATA, and the SCSI (small computer system interface) has been replaced with a SAS (serial attached SCSI).

In these serial transfer interfaces, a method of obtaining a more stable signal waveform is requested to use a high-frequency band by automatically correcting a loss at each frequency band.

FIG. 1 shows an example of the configuration using a conventional serial transfer interface.

A serial transfer interface 70 shown in FIG. 1 is connected to a transmission path 72 for transmitting the signal waveform output from a transmitter 71, a circuit in a transmission path 72 (hereinafter referred to as a "subsequent circuit"). Generally, the transmission path 72 is constituted by a printed substrate, a connector, a cable, etc.

The serial transfer interface 70 includes: an equalizer unit 74 capable of externally selecting and setting a plurality of high pass filter characteristics; a latch unit 75 for amplifying a voltage so that a signal waveform adjusted by the equalizer unit 74 can be easily processed in a subsequent circuit, latching the signal waveform according to the synchronous clock generated by a clock generation unit 77, and outputting the signal waveform to the subsequent circuit; a digital filter unit 76 for controlling the clock generation unit 77 to appropriately follow a low frequency jitter including the difference in data transfer speed and suppress excess following to a high frequency jitter; and a clock generation unit 77 for generating a synchronous clock to latch a signal waveform at an appropriate point on a time axis.

The signal waveform output from the transmitter 71 is transmitted to the receiver 73 through the transmission path 72. The signal waveform input to the receiver 73 is adjusted by the equalizer unit 74, amplified by the latch unit 75, latched according to the synchronous clock, and output to the subsequent circuits.

The digital filter unit 76 detects a jitter from a signal waveform, instructs the clock generation unit 77 to appropriately follow a low frequency jitter, and instructs the clock generation unit 77 to suppress excessively following a high frequency jitter.

Then, the clock generation unit 77 generates a synchronous clock at an instruction from the digital filter unit 76, and provides it for the latch unit 75.

The waveform 1 shows the eye pattern measured between the transmitter 71 and the transmission path 72. Similarly, the waveform 2 shows the eye pattern between the transmission path 72 and the receiver 73. The waveform 3 shows the eye pattern between the equalizer unit 74 and the latch unit 75.

As shown by the waveform 2, the signal waveform has waveform variance by the characteristic variance by the change in environment (temperature change, etc.) of the transmission path 72, etc. and the characteristic of the LSI process.

The conventional serial transfer interface obtains the signal waveform (the waveform 2 shown in FIG. 1), etc. received by the receiver by an observation using an oscilloscope measurement device or a simulation, determines the optimum setting of the equalizer unit 74 while referring to the characteristic of the equalizer unit 74 of the receiver described on the datasheet, and manually performs the setting.

As explained above by referring to FIG. 1, according to the observation result by the oscilloscope of the signal waveform received by the receiver 73 and the characteristic of the equalizer unit 74 of the receiver 73 provided by the datasheet from an LSI maker, the substantially optimum setting of the equalizer unit 74 can be manually performed.

However, a long time is required to observe the signal waveform (for example, waveforms 1 through 3) of each path of the transmission path 72 and the receiver 73.

For example, since a four-lane path is provided for each of the forward and backward path, the waveform observation is required for a total of eight lanes. Additionally, to display an eye pattern on the oscilloscope, it requires a time to perform a setup for a measurement, and an observation time of about 20 seconds per lane.

Although a waveform can be measured and the equalizer unit 74 can be optimized using only representative lanes and the connection condition of other lanes can be matched with the representative lanes, it may be difficult for sufficient optimization. Furthermore, it is necessary to design a dedicated printed substrate.

Furthermore, the output terminal of the equalizer unit 74 is not assigned for observation of a waveform. Therefore, it may be difficult for some devices to observe a waveform due to deficient space for a probe. Therefore, it may not be possible to confirm that a signal waveform has been successfully corrected by the set equalizer.

Japanese Published Patent Application No.H11-203787 discloses an optical disk regeneration device provided with a characteristic control circuit of an equalizer unit for maintaining a predetermined or lower value of an error rate and a jitter value by providing the equalizer unit with a cutoff frequency characteristic control signal corresponding to the regeneration position of an optical disk, changing the gain characteristic of the equalizer unit, and correctly binarizing an RF signal.

SUMMARY OF THE INVENTION

The present invention has been developed to solve the above-mentioned problem, and the advantage of the present invention is to provide a serial transfer interface capable of realizing transmission of a stable and high-quality signal although there is characteristic variance by an environment change and an LSI process.

To solve the above-mentioned problem, the serial transfer interface according to the present invention corrects the distortion of a signal waveform using a filter characteristic, latches the signal waveform according to a synchronous clock, and outputs it to a subsequent circuit. The serial transfer interface includes: a filter characteristic adjustment unit for changing the filter characteristic; a clock generation unit capable of changing the phase of the synchronous clock; and a pattern discrimination unit for changing the filter characteristic and the phase of the synchronous clock in the respective predetermined ranges when a test pattern as a test signal is input, designating the optimum filter characteristic and phase of the synchronous clock in the respective ranges of the filter characteristic and phase of the synchronous clock in which the test pattern can be received, and changing the characteristic and the phase to the optimum filter characteristic and phase of the synchronous clock using the filter characteristic adjustment unit and the clock generation unit.

According to the present invention, when the pattern discrimination unit detects that a test pattern has been input, it designates the ranges of the filter characteristic and phase of the synchronous clock in which a test pattern can be received while changing the filter characteristic and the phase of a synchronous clock in the respective predetermined ranges using the filter characteristic adjustment unit and the clock generation unit, and designates the optimum filter characteristic and phase of the synchronous clock in the designated ranges.

Thus, for example, although there are characteristic variances by an environment change such as a temperature change, etc. and an LSI process, the serial transfer interface can be easily optimized, thereby having the effect of transmitting a stable and high-quality signal.

The present invention can also obtain a similar effect from an optimizing method for a serial transfer interface for correcting the distortion of a signal waveform using a filter characteristic, latching the signal waveform according to a synchronous clock, and outputting it to a subsequent circuit. The method includes: comparing the signal waveform with the test pattern; detecting that the test pattern has been received from the comparison result; when detecting the test pattern, sequentially changing the filter characteristic in a first range, and sequentially changing the phase of the synchronous clock to the filter characteristic in a second range; each time one or both of the filter characteristic and the phase of the synchronous clock are changed, obtaining a receivable range indicating whether or not a test pattern can be received with the filter characteristic and the phase of the synchronous clock from the comparison result; designating the optimum filter characteristic and phase of the synchronous clock in the receivable range; and changing the characteristic and phase to the optimum filter characteristic and phase of the synchronous clock.

As described above, according to the present invention, although there are characteristic variances by an environment change and an LSI process, a serial transfer interface for realizing transmission of a stable and high-quality signal can be provided.

BRIEF DESCRIPTION OF THE DRAWINGS

FIG. 6 shows an example of the receivable range table according to an embodiment of the present invention.

DESCRIPTION OF THE PREFERRED EMBODIMENTS

The embodiments of the present invention are explained below by referring to FIGS. 2 through 7.

Figure 1:
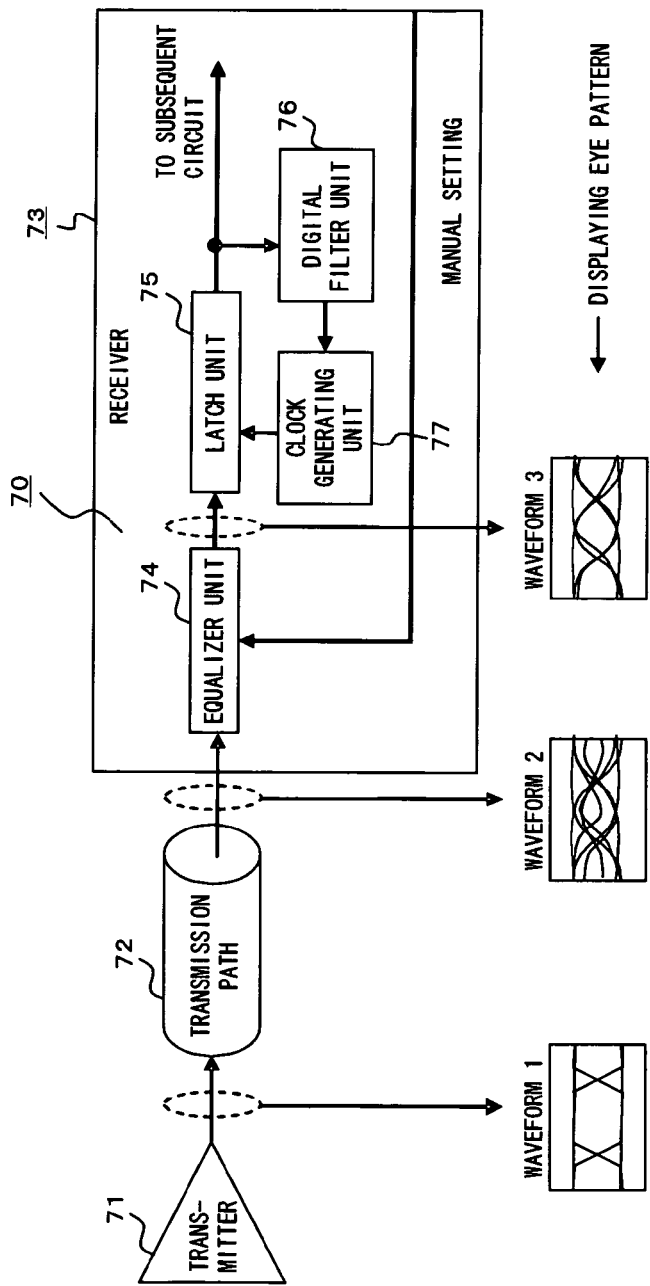
FIG. 1 shows an example of the configuration using the conventional serial transfer interface.
Figure 2:
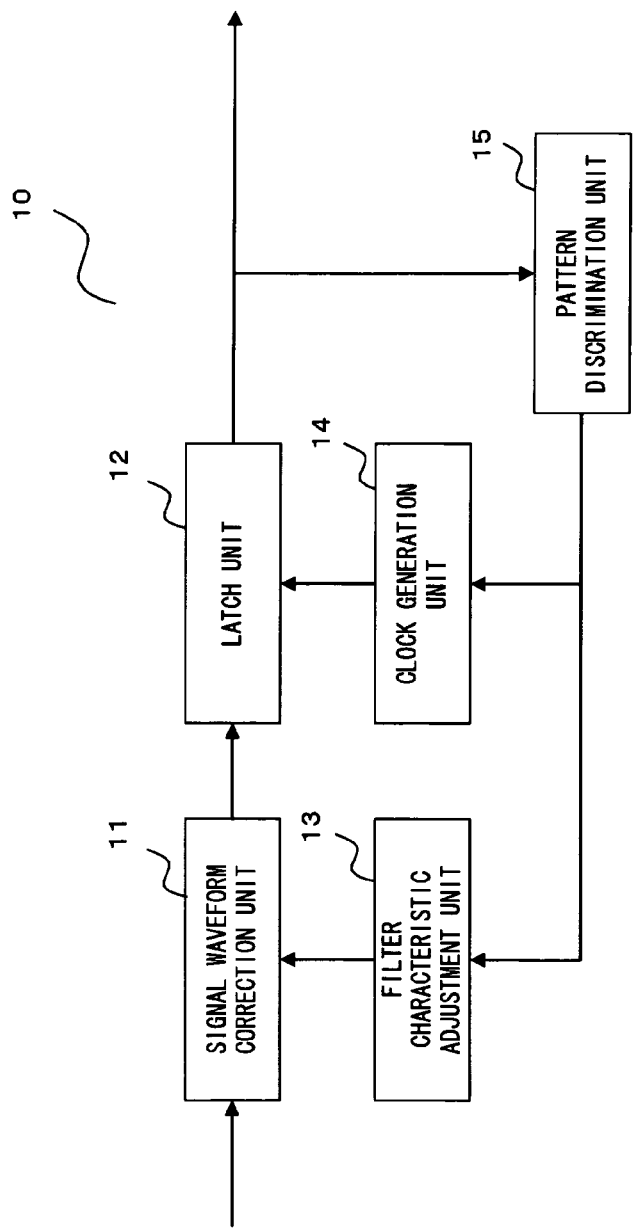
FIG. 2 is an explanatory view of the principle of the present invention.

FIG. 2 is an explanatory view showing the principle of the present invention.

A serial transfer interface 10 shown in FIG. 2 includes a signal waveform correction unit 11 for correcting the distortion of a signal waveform using a filter characteristic, a latch unit 12 for latching the corrected signal waveform according to a synchronous clock and outputting the latched waveform to a subsequent circuit, a filter characteristic adjustment unit 13 for changing the filter characteristic of the signal waveform correction unit 11 in a predetermined range, a clock generation unit 14 for generating a synchronous clock having a desired phase, and a pattern discrimination unit 15 for detecting a test pattern as a test signal and controlling the filter characteristic adjustment unit 13 and the clock generation unit 14.

The signal waveform correction unit 11 corrects the distortion of a signal waveform using the filter characteristic obtained by combining, for example, a low pass filter, a high pass filter, a band pass filter, etc. Then, it outputs the corrected signal waveform to the latch unit 12.

The latch unit 12 latches the signal waveform corrected by the signal waveform correction unit 11 according to the synchronous clock input from the clock generation unit 14, and outputs the latched signal to the subsequent circuit of the serial transfer interface 10.

The filter characteristic adjustment unit 13 changes the filter characteristic of the signal waveform correction unit 11 in a predetermined range. For example, by switching the combination of a low pass filter, a high pass filter, a band pass filter, etc. by a switch, etc., the filter characteristic of the signal waveform correction unit 11 can be changed.

The clock generation unit 14 generates a synchronous clock of the phase specified by the pattern discrimination unit 15. Then, the clock generation unit 14 outputs the generated synchronous clock to the latch unit 12. For example, it is realized by a PLL (phase locked loop) circuit.

The pattern discrimination unit 15 compares the test pattern stored in the test pattern storage unit not shown in the attached drawings with the output signal output by the latch unit 12, and determines that the test pattern has been detected when the comparison indicates a matching result. That is, it detects that a test pattern has been input to the serial transfer interface 10.

When the pattern discrimination unit 15 detects a test pattern, it controls the filter characteristic adjustment unit 13 and the clock generation unit 14, changes the filter characteristic of the signal waveform correction unit 11 and the phase of the synchronous clock input to the latch unit 12 in a predetermined range, and determines whether or not the test pattern is to be received. Then, it designates the ranges (hereinafter referred to as a "receivable range") of the filter characteristic and the phase of the synchronous clock in which the test pattern can be received.

When the receivable ranges are designated, the pattern discrimination unit 15 designates in the receivable range the optimum filter characteristic and phase of the synchronous clock for correction of the distortion of the signal waveform by the signal waveform correction unit 11 (hereinafter the filter characteristic is referred to as the "optimum filter characteristic", and the phase of the synchronous clock as the "optimum phase").

The pattern discrimination unit 15 changes the filter characteristic such that the signal waveform correction unit 11 can have the optimum filter characteristic by the filter characteristic adjustment unit 13. The pattern discrimination unit 15 also makes settings such that the clock generation unit 14 can generate a synchronous clock having the optimum phase.

In the above-mentioned process, although there are characteristic variances by an environment change in the transmission path for transmitting a signal to the serial transfer interface 10 and an LSI process, the signal waveform correction unit 11 can make adjustments such that the transmission path has the optimum filter characteristic. As a result, a serial transfer interface for transmitting a stable and high-quality signal can be realized.

Described below is an example of realizing the signal waveform correction unit 11 by an equalizer unit 24, and the filter characteristic adjustment unit 13 by a characteristic adjustment unit 28.

Figure 3:
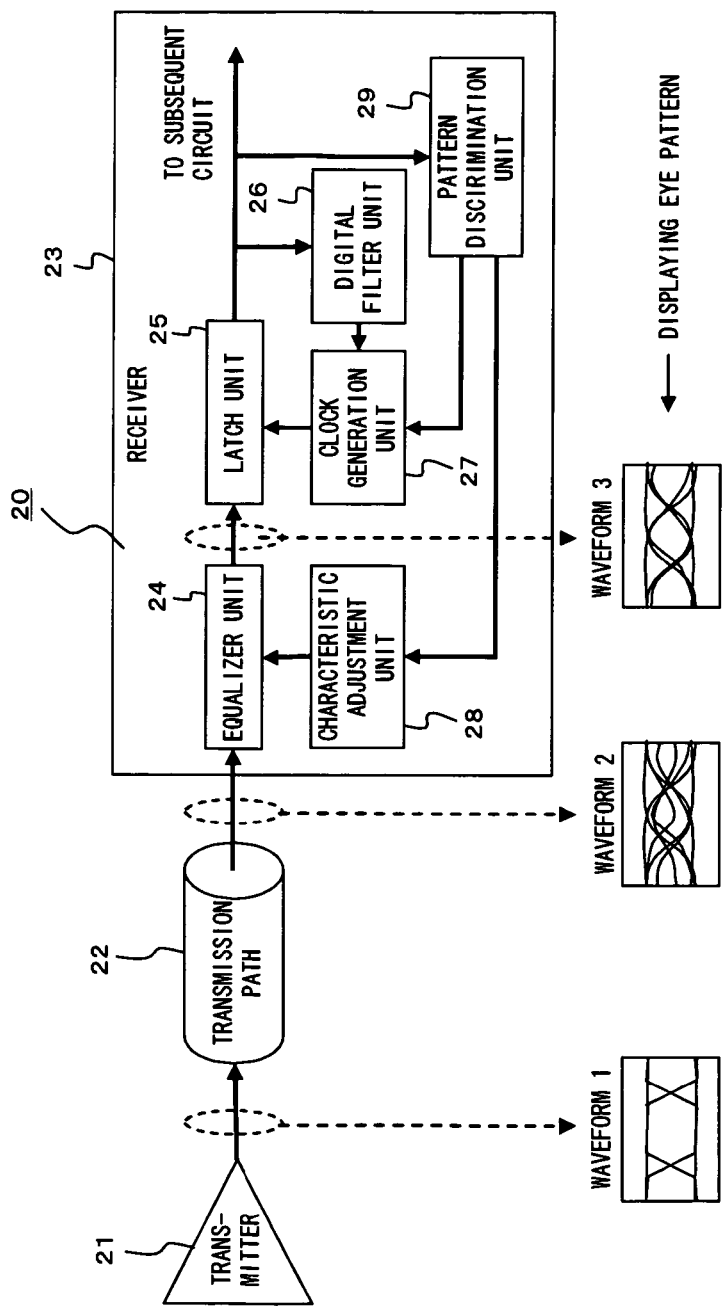
FIG. 3 shows an example of the configuration using the serial transfer interface according to an embodiment of the present invention.

FIG. 3 shows an example of the configuration using a serial transfer interface 20 according to an embodiment of the present invention.

The serial transfer interface 20 according to the present embodiment shown in FIG. 3 is provided in a receiver 23, and connected to a transmission path 22 for transmitting a signal waveform output from a transmitter 21, and a subsequent circuit.

The transmission path 22 is constituted by a printed substrate, a connector, a cable, etc.

The serial transfer interface 20 comprises: the equalizer unit 24 capable of selecting and setting the filter characteristic (equalizer characteristic); a latch unit 25 for amplifying the voltage for easy processing of a signal waveform adjusted by the equalizer unit 24 in a subsequent circuit, latching the signal waveform according to the synchronous clock generated by a clock generation unit 27, and outputting the latched signal waveform to a subsequent circuit; a digital filter unit 26 for controlling the clock generation unit 27 for appropriately following a low frequency jitter including the difference in data transfer speed and suppressing excess following to a high frequency jitter; the clock generation unit 27 for generating a synchronous clock for latching a signal waveform at an appropriate point on a time axis; the characteristic adjustment unit 28 for adjusting the filter characteristic of the equalizer unit 24; and a pattern discrimination unit 29 for determining whether or not the output signal output from a latch unit 25 is a test pattern.

The equalizer unit 24 is constituted by combining a plurality of filters (a low pass filter, a high pass filter, a band pass filter, etc.). By changing the combination of the filters, a filter characteristic can be changed.

The latch unit 25 latches an output signal of the equalizer unit 24 according to the synchronous clock generated by the clock generation unit 27. Then, it outputs the signal latched in the subsequent circuit of the serial transfer interface 20.

The clock generation unit 27 generates a synchronous clock of a phase specified by the digital filter unit 26 or the pattern discrimination unit 29. Then, it outputs the generated synchronous clock to the latch unit 25. The clock generation unit 27 according to the present embodiment uses a PLL circuit to adjust the phase of the synchronous clock in 16 levels from the clock phase numbers 0 through 15.

The characteristic adjustment unit 28 changes the filter characteristic of the equalizer unit 24 at an instruction of the pattern discrimination unit 29. Examples of the configurations of the equalizer unit 24 and the characteristic adjustment unit 28 are described later by referring to FIG. 4.

The pattern discrimination unit 29 has a test pattern storage unit for storing a test pattern although it is not shown in the attached drawings. Then, by comparing the test pattern with the output signal from the latch unit 25, the serial transfer interface 20 detects that the test pattern has been received.

A signal which repeats a pattern constituted by two or more bits plural number of times (for example, signals "11110000", "11001100", "10101010", etc.) can be used as a test pattern.

When a test pattern is detected, the pattern discrimination unit 29 stops the correcting process by the digital filter unit 26 on a jitter, controls the clock generation unit 27 and the characteristic adjustment unit 28 to change the phase of the synchronous clock to be input to the latch unit 25 and the filter characteristic of the equalizer unit 24 in predetermined ranges, thereby generating a receivable range table (refer to FIG. 6) showing the ranges of the filter characteristic and the phase of the synchronous clock in which a test pattern can be received.

The optimum filter characteristic and the phase of the synchronous clock for use by the equalizer unit 24 to correct the distortion of a signal waveform are designated from the centroid of the ranges of the filter characteristic and the phase of the synchronous clock in the receivable range table. Then, the clock generation unit 27 generates a synchronous clock having the optimum phase, and the characteristic adjustment unit 28 changes the filter characteristic such that the equalizer unit 24 can have the optimum filter characteristic.

Figure 4:
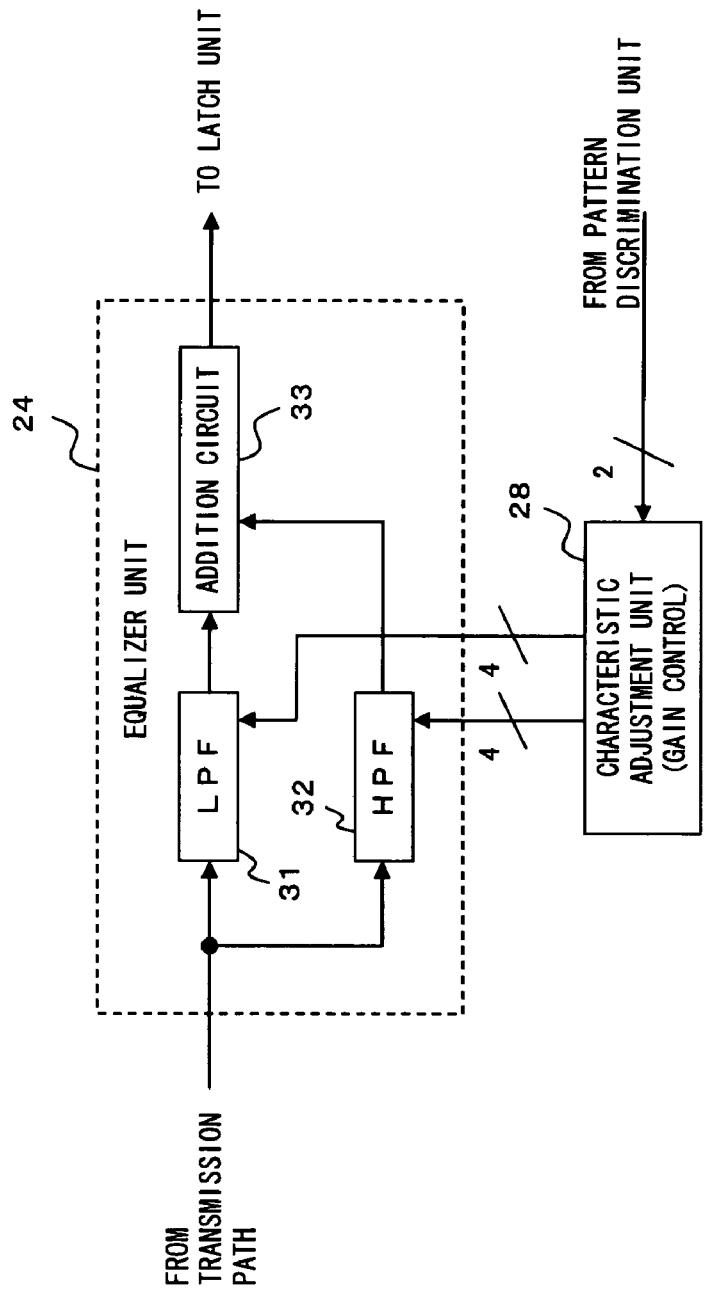
FIG. 4 shows an example of the configuration of the equalizer unit and the characteristic adjustment unit shown in FIG. 3.

FIG. 4 shows an example of the configuration of the equalizer unit 24 and the characteristic adjustment unit 28.

The equalizer unit 24 shown in FIG. 4 comprises an LPF (low pass filter) 31, an HPF (high pass filter) 32, and an addition circuit 33 for combining the output waveforms of the LPF 31 and the HPF 32.

The LPF 31 is a low pass filter capable of switching the filter characteristics according to a control signal (hereinafter referred to as a "first characteristic adjustment code"). In the present embodiment, the filter characteristic can be switched among 4 levels using a 4-bit control signal. For example, the filter characteristic can be switched among four levels corresponding to "0001 (B)", "0010 (B)", "0100 (B)", and "1000 (B)".

Similarly, the HPF 32 is a high pass filter capable of switching the filter characteristics according to a control signal (hereinafter referred to as a "second characteristic adjustment code"). Like the LPF 31, the filter characteristic can be switched among 4 levels using a 4-bit control signal.

The addition circuit 33 combines the output waveforms of the LPF 31 and the HPF 32, and outputs the composite signal waveform to the latch unit 25.

As explained above, the equalizer unit 24 can switch 16 (4×4) levels of filter characteristics. Therefore, equalizer setting numbers 0 through 15 are assigned to the respective filter characteristics.

The characteristic adjustment unit 28 generates the first and second characteristic adjustment codes depending on the control codes (hereinafter referred to as a "characteristic directive code") transmitted from the pattern discrimination unit 29.

In the present embodiment, a 2-bit characteristic directive code is used. For example, "01 (B)" is defined as an increment directive, "10 (B)" is defined as a decrement directive, "00 (B)" is defined as a fixed directive, and "11 (B)" is defined as an initialize directive.

When the characteristic directive code "01 (B)" is input, the characteristic adjustment unit 28 increments the equalizer setting number by 1, generates the first and second characteristic adjustment codes corresponding to the equalizer setting numbers, and outputs the respective characteristic adjustment codes to the LPF 31 and the HPF 32.

When the characteristic directive code "10 (B)" is input, the characteristic adjustment unit 28 decrements the equalizer setting number by 1, generates the first and second characteristic adjustment codes corresponding to the equalizer setting numbers, and outputs the respective characteristic adjustment codes to the LPF 31 and the HPF 32.

When the characteristic directive code "00 (B)" is input, the characteristic adjustment unit 28 does not change the equalizer setting number. That is, it does not change the filter characteristic of the equalizer unit 24.

The above-mentioned characteristic adjustment unit 28 and pattern discrimination unit 29 can be constituted by a logical circuit or can be realized by allowing the CPU not shown in the attached drawings to execute a predetermined program.

Figure 5:
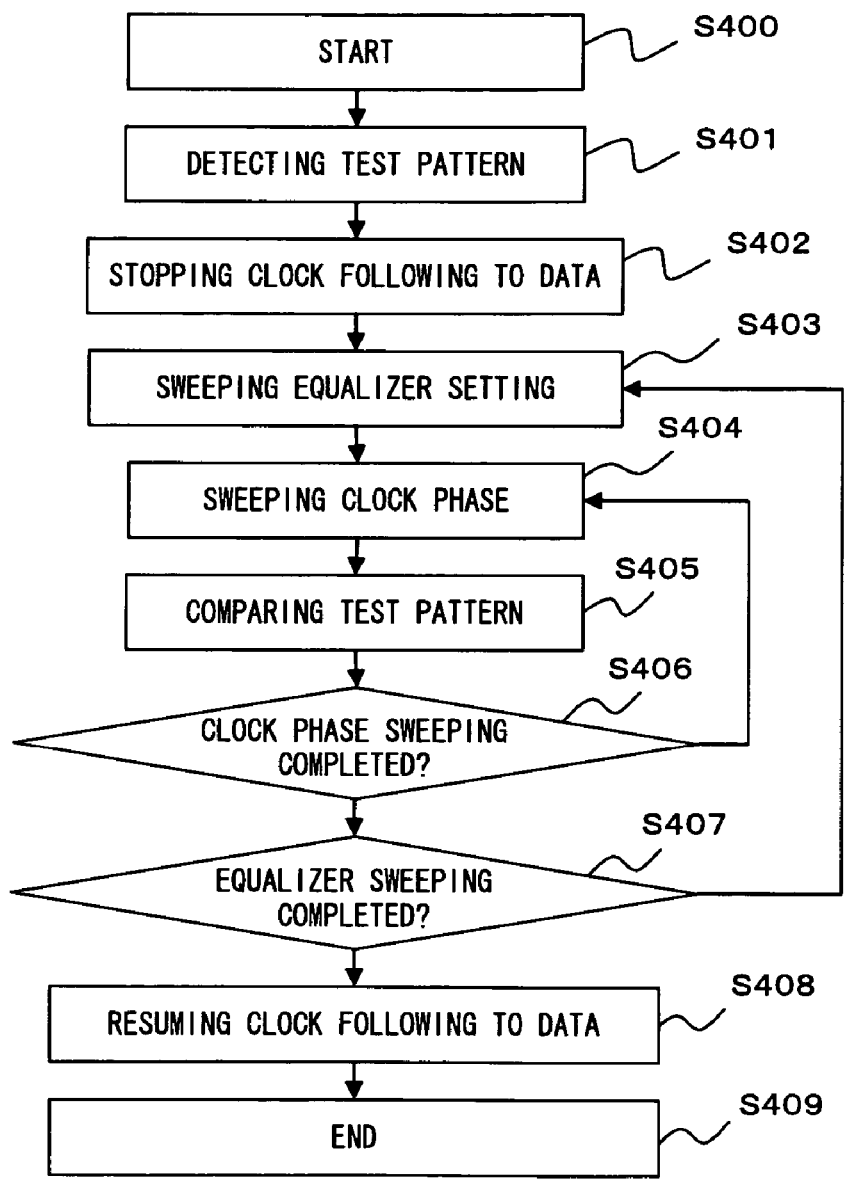
FIG. 5 is a flowchart of the optimizing process of the filter characteristic according to an embodiment of the present invention.

FIG. 5 is a flowchart showing the optimizing process of the filter characteristic according to the present embodiment.

When the serial transfer interface 20 starts its operation, the pattern discrimination unit 29 starts comparing the output signal of the latch unit 25 with the test pattern stored in the test pattern storage unit of the pattern discrimination unit 29 (step S400).

When the serial transfer interface 20 starts its operation, the operator continues transmitting a test pattern from the transmitter 21 through the transmission path 22 until the processes in steps S401 through S409 are completed.

In step S401, when the output signal of the latch unit 25 matches the test pattern, the pattern discrimination unit 29 determines that it has detected the test pattern, and passes control to step S401.

In step S402, the serial transfer interface 20 stops the operation of the digital filter unit 76, and stops the jitter correcting process of following the signal waveform using the synchronous clock, etc. Then, control is passed to step S403.

In step S403, the pattern discrimination unit 29 starts the process of changing a filter characteristic (hereinafter referred to as a "filter characteristic sweeping process"). That is, the pattern discrimination unit 29 outputs the characteristic directive code "11 (B)" to the characteristic adjustment unit 28 to initialize the settings, and sets the equalizer setting number to 0.

In step S404, the pattern discrimination unit 29 starts the process of changing the phase of the synchronous clock to be generated by the clock generation unit 27 (hereinafter referred to as a "phase sweeping process"). That is, the pattern discrimination unit 29 outputs the characteristic directive code "11 (B)" to initialize the settings, and sets the clock number to 0.

In step S405, the pattern discrimination unit 29 compares the output signal of the latch unit 25 with the test pattern. When the comparing process outputs a matching result, the unit discriminates that the test pattern can be received, and stores "1" in a receivable range table 50.

When the comparing process outputs a non-matching result, the unit discriminates that the test pattern cannot be received, and stores "0" in the receivable range table 50.

FIG. 6 shows the receivable range table 50. As shown in FIG. 6, the receivable range table 50 shows whether or not the serial transfer interface 20 can receive a test pattern when each clock phase number corresponding to the equalizer setting number is indicated. The receivable range table 50 is stored in the storage unit (not shown in the attached drawings) of the serial transfer interface 20.

When the serial transfer interface 20 can receive a test pattern, "1" is stored, and when it cannot receive a test pattern, "0" is stored.

When the process of comparing a test pattern is completed in step S405, the pattern discrimination unit 29 passes control to step S406.

In step S406, the pattern discrimination unit 29 checks whether or not the synchronous clock phase sweeping process has been completed. That is, it is checked whether or not the clock phase number is 15.

If the synchronous clock phase sweeping process has not been completed, the pattern discrimination unit 29 passes control to step S404, outputs the characteristic directive code "01 (B)" to the clock generation unit 27, and increments the clock phase number by 1. Then, it performs a test pattern comparing process in step S405.

Until the synchronous clock phase sweeping process is completed, the unit repeats the processes in steps S404 through S406. When the synchronous clock phase sweeping process is completed, the pattern discrimination unit 29 passes control to step S407.

Figure 7:
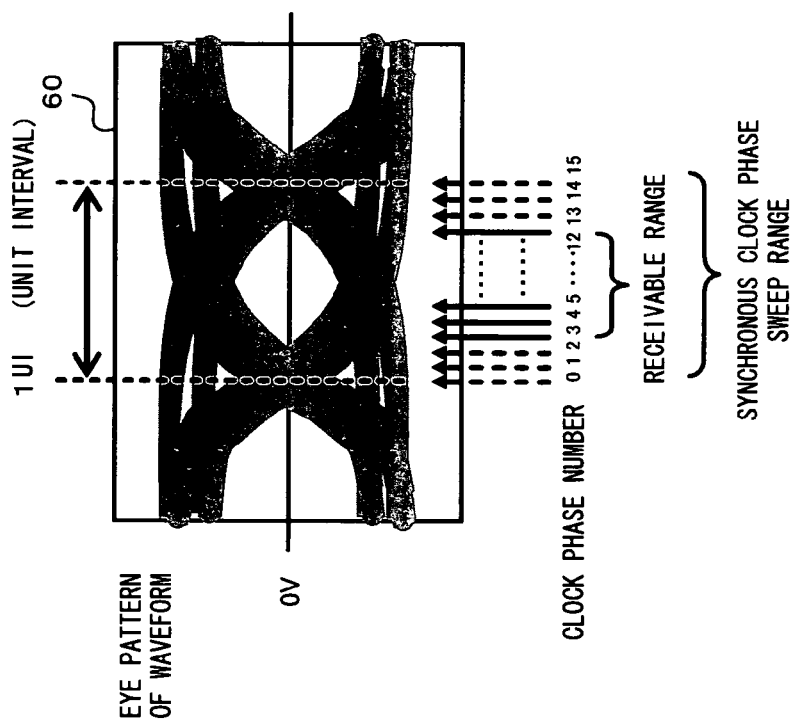
FIG. 7 is an explanatory view of the phase sweeping process of the synchronous clock according to an embodiment of the present invention.

FIG. 7 shows the outline of the process in steps S404 through S406.

The eye pattern 60 shown in FIG. 7 shows a signal waveform observed between the equalizer unit 24 and the latch unit 25 and set in the filter characteristic (equalizer setting number 3) determined in step S403.

Each time the processes in steps S404 through S406 are repeated, the clock phase number is sequentially changed from 0 to 15. At this time, the clock phase number changes in the range of 1 UI (unit interval).

It is checked whether or not the signal latched by the latch unit 25 according to the synchronous clock generated by the setting of each clock phase number matches a test pattern (whether or not a test pattern can be received).

The eye pattern 60 shown in FIG. 7 shows that the test pattern can be received when the synchronous clock generated by the setting of the clock phase numbers 3 through 12 is used.

In step S407, the pattern discrimination unit 29 checks whether or not the filter characteristic sweeping process has been completed. That is, it checks whether or not the equalizer setting number is 15.

If the filter characteristic sweeping process has not been completed, the pattern discrimination unit 29 passes control to step S403. Then, it outputs the characteristic directive code "01 (B)" to the characteristic adjustment unit 28, increments the equalizer setting number by 1, and passes control to step S404.

Then, the processes in steps S403 through S407 are repeated until the filter characteristic sweeping process is completed. When the filter characteristic sweeping process is completed, the pattern discrimination unit 29 passes control to step S408.

In the processes in steps S403 through S407, the receivable range table 50 shown in FIG. 6 is generated.

In step S408, the pattern discrimination unit 29 obtains the position of the centroid of the receivable range (range in which "1" is set) when the equalizer setting number relates to the X axis, and the clock phase number relates to the Y axis in the receivable range table 50. The equalizer setting number and the clock phase number corresponding to the position of the centroid are respectively set in the characteristic adjustment unit 28 and the clock generation unit 27.

Then, the data (hereinafter referred to as "completion notification data") is transmitted at 1/n time the data transfer speed to the transmitter 21, thereby notifying that the process has been completed.

Transmitting data at 1/n time the data transfer speed can be realized by alternately combining one or more pieces of data, and each piece is formed by n same consecutive values ("1" or "0") and n consecutive inverted values.

For example, to transfer data at ¼ time the data transfer speed, the value "1111" formed by four same consecutive values and the values "0000" formed by four consecutive inverted values are alternately combined into "11110000" and transmitted as completion notification data.

Then, the operation of the digital filter unit 76 stopped in step S402 is resumed, thereby terminating the process (step S409).

As explained above, the serial transfer interface 20 according to the present invention detects that a test pattern has been input by transmitting the test pattern from the transmitter 21.

Then, the filter characteristic sweeping process is performed on the filter characteristic of the equalizer unit 24, and the phase sweeping process is performed on the phase of the synchronous clock, thereby detecting the receivable range of a test pattern (a receivable range table is generated).

To further detect a test pattern from the receivable range, the optimum filter characteristic of the equalizer unit 24 and optimum phase generated by the clock generation unit 27 are determined and automatically set.

As a result, after the waveform measurement, simulation, etc. of an eye pattern, etc. is performed, additional manual operations of adjusting the equalizer unit 24, etc. are not required. Therefore, the serial transfer interface 20 (equalizer unit 24 and clock generation unit 27) can be easily optimized.

Since the operator can perform optimization only by transmitting a test pattern from the transmitter 21, the serial transfer interface 20 can be easily optimized although there are a large number of paths (forward and backward lanes) or it is difficult to observe the signal waveform because a probe cannot be used.

Although there are characteristic variances due to the LSI process of the transmission path 22, etc. or it is necessary to optimize the signal waveform again due to an environment change, the serial transfer interface 20 can be easily optimized. Therefore, a serial transfer interface capable of realizing the transmission of a stable and high-quality signal can be provided.

In the explanation above, the equalizer setting number and the clock phase number are 0 through 15, but it is obvious that the numbers are not limited to the values. That is, the maximum value can be set as necessary in each case.

What is claimed is:

1. A serial transfer interface which corrects distortion of a signal waveform using a filter characteristic, latches the signal waveform according to a synchronous clock, and outputs the waveform to a subsequent circuit, comprising:
   a filter characteristic adjustment unit changing the filter characteristic;
   a clock generation unit capable of changing a phase of the synchronous clock; and
   a pattern discrimination unit changing the filter characteristic and the phase of the synchronous clock in respective predetermined ranges when a test pattern as a test signal is input, designating an optimum filter characteristic and phase of the synchronous clock in the respective ranges of the filter characteristic and phase of the synchronous clock in which the test pattern can be received, and changing the characteristic and the phase to the optimum filter characteristic and phase of the synchronous clock using the filter characteristic adjustment unit and the clock generation unit.

2. The interface according to claim 1, wherein the pattern discrimination unit comprises:
   a test pattern detection unit comparing the signal waveform with the test pattern, and detecting from a comparison result that a test pattern has been received;
   a parameter change unit allowing the filter characteristic adjustment unit to sequentially change the filter characteristic in a first range, and allowing the clock generation unit to sequentially change the phase of the synchronous clock on the filter characteristic in a second range; and
   a parameter designation unit obtaining from a detection result by the test pattern detection unit a receivable range indicating whether or not a test pattern can be received in the filter characteristic and the phase of the synchronous clock, and designating an optimum filter characteristic and phase of a synchronous clock in the receivable range.

3. The interface according to claim 2, wherein the parameter designation unit generates a receivable range table showing whether or not a test pattern can be received in the filter characteristic and the phase of the synchronous clock from a detection result by the test pattern detection unit, and designates an optimum filter characteristic and phase of a synchronous clock from a centroid of a receivable range indicated by the filter characteristic and the synchronous clock of the receivable range table.

4. The interface according to claim 1, wherein the filter characteristic adjustment unit changes a filter characteristic from one or a combination of two of a low pass filter, a high pass filter, and a band pass filter.

5. The interface according to claim 1, wherein the pattern discrimination unit notifies that a process of designating the optimum filter characteristic and phase of the synchronous clock has been completed by transmitting predetermined data at 1/n time a data transfer speed to a transmitter.

6. An optimizing method for a serial transfer interface which corrects distortion of a signal waveform using a filter characteristic, latches the signal waveform according to a synchronous clock, and outputs it to a subsequent circuit, comprising:
   comparing the signal waveform with the test pattern and detecting that the test pattern has been received from the comparison result;
   when detecting the test pattern, sequentially changing the filter characteristic in a first range, and sequentially changing the phase of the synchronous clock to the filter characteristic in a second range;
   each time one or both of the filter characteristic and the phase of the synchronous clock are changed, obtaining a receivable range indicating whether or not a test pattern can be received with the filter characteristic and the phase of the synchronous clock from the comparison result; and
   designating the optimum filter characteristic and phase of the synchronous clock in the receivable range, and changing the characteristic and phase to the optimum filter characteristic and phase of the synchronous clock.

7. The method according to claim 6, wherein:
the optimum filter characteristic and phase of the synchronous clock generates from the comparison result a receivable range table showing whether or not a test pattern can be received in the filter characteristic and the phase of the synchronous clock, and performs designation from a centroid of a receivable range indicated by the filter characteristic and the synchronous clock of the receivable range table.

* * * * *